United States Patent Office 3,509,042
Patented Apr. 28, 1970

3,509,042
SHAPE SELECTIVE ZEOLITE HAVING A METAL
COMPONENT THEREIN
Joseph N. Miale, Trenton, N.J., assignor to Mobil Oil
Corporation, a corporation of New York
No Drawing. Continuation-in-part of application Ser. No. 431,180, Feb. 8, 1965, which is a continuation-in-part of application Ser. No. 86,582, Feb. 2, 1961. This application May 17, 1967, Ser. No. 639,046
Int. Cl. C10g *11/02;* B01j *11/40*
U.S. Cl. 208—120                    10 Claims

ABSTRACT OF THE DISCLOSURE

A shape selective metal-containing catalyst characterized by treatment with an ion solution incapable of penetrating into the interior of the zeolite and capable of removing by base exchange metal ions from the external surfaces of the zeolite. The ion solution may comprise an ion sufficiently large to be incapable of penetrating into the interior of the zeolite such as tetramethylammonium or an ion dissolved in a solvent which has sufficiently large molecules to be incapable of penetrating the zeolite, such as calcium ions dissolved in dimethylformamide.

CROSS REFERENCES

This application is a continuation-in-part of Ser. No. 431,180, filed Feb. 8, 1965 by J. Miale now U.S. Patent 3,344,058 and of Ser. No. 86,582, filed Feb. 2, 1961 by J. Miale, now abandoned; the former being a continuation-in-part of the latter.

BACKGROUND

The present invention is directed to a method which improves the shape selectivity of a broad range of metal-containing zeolite catalysts. The metal components useful in this invention, selected from Periodic Groups I*b*, II*b*, III*a*, IV, V, VI, VII and VIII, may be added to the zeolite by conventional base exchange, by competing-ion base exchange or by coprecipitation of the zeolite and metal containing components, each of these methods being described in Ser. No. 431,180 or by prior art referred to in said application. The catalysts made by these methods are suitable for the shape selective conversion of hydrocarbon charges consisting of components of different molecular size. Although several methods may be used to incorporate a major portion of the metal component within the interior of the zeolite, the shape selectivity of the resultant catalyst may be lessened by the presence of metal components on the exterior surface of the zeolite. This problem is overcome in the present invention by treating the zeolite with an ion solution incapable of penetrating into the interior of said zeolite and capable of removing the metal component from the exterior of the zeolite.

THE INVENTION

This invention relates to an improved catalyst, a method for its preparation and its use in hydrocarbon conversion processes. More particularly, the present invention is directed to a catalyst useful in a selective process for converting a portion of a mixture of hydrocarbons of varying molecular size, wherein the catalyst composition comprises a catalytically active metal component distributed within the pores of a crystalline aluminosilicate zeolite characterized by rigid three-dimensional networks and uniform interstitial dimensions. After combination of the catalytically active metal component with the zeolite, the catalyst is treated with an ion solution incapable of entering the pores of the zeolite and capable of removing, by base exchange, the catalytically active metal component from the exterior surface of the zeolite. This procedure improves the shape selectivity of the resultant catalyst.

The catalysts prepared in accordance with this invention find extensive utility in a wide variety of hydrocarbon conversion processes including isomerization, dealkylation, alkylation, disproportionation, hydration of olefins, amination of olefins, hydrocarbon oxidation, dehydrogenation, dehydration of alcohols, desulfuration, hydrogenation, hydroforming, reforming, cracking, hydrocracking, oxidation, polymerization and the like.

The molecular sieve materials useful for this invention are composed of crystalline metal aluminosilicates, which have been heated to remove their water of hydration. The crystals obtained upon dehydration are usually porous, the pores having uniform molecular dimensions, generally between about 4 and 15 Angstrom units in diameter. Each crystal of molecular sieve material contains literally billions of tiny cavities or cages interconnected by channels of unvarying diameter. The size and portion of the metal ions in the crystal control the effective diameter of the interconnecting channels. As initially prepared, the metal of the aluminosilicate is an alkali or alkaline earth metal. Sodium and calcium crystalline aluminosilicates of the molecular sieve type are available commercially, and will ordinarily be employed for subsequent treatment to introduce a metal component into the pores thereof. It is, however, possible to initially utilize a molecular sieve material wherein the metal ion is other than a sodium or calcium ion or wherein such cation has been replaced by a hydrogen ion. Molecular sieve materials of the A type, X type, Y type or other well known forms are available, and include the 13X and 10X types which are sodium and sodium-calcium crystalline aluminosilicates, capable of adsorbing molecules whose critical diameter is less than about 10 Angstrom units, and the 4A and 5A types which are sodium and sodium-calcium crystalline aluminosilicates having channel diameters which will permit adsorption of molecules smaller than about 4 and 5 Angstrom units, respectively. Preparation of these molecular sieves is well known, having been described in the literature, for example, in U.S. 2,882,243 and U.S. 2,882,244. The molecular sieve material utilized in preparation of the catalysts of this invention is essentially characterized by uniform pore characteristics capable of affording separation between components of different molecular size making up the hydrocarbon charge. Particularly effective molecular sieve materials for such purpose are those having uniform effective pore diameters within the approximate range of 4 to 7 Angstrom units. An especially feasible starting material is the commercially available 5 A. molecular sieve.

A component exhibiting conversion activity is encased within the crystalline structure of the aluminosilicate above-described. Suitable metal components include one or more of the metals of Groups I*b*, II*b*, III*a*, IV, V, VI, VII and VIII of the Periodic Table. Representative of these metals are copper, zinc, rare earths, actinium, titanium, tin, molybdenum, chromium, tungsten, iron, vanadium, cobalt, nickel, manganese, and metals of the platinum group, i.e., platinium, palladium, osmium, rhodium, ruthenium and iridium as well as combinations of these metals, their salts, oxides or sulfides. Representative of the anion of the catalytically active metal salts which can be employed to base exchange the aluminosilicates include chlorides, bromides, iodides, carbonates, bicarbonates, sulfates, sulfides, thiocyanates, dithiocarbonates, peroxysulfates, acetates, benzoates, oxalates, citrates, fluorides, nitrates, nitrites, formates, etc. The only limitation of the particular salts is that they be sufficiently soluble to give the necessary ion transfer. The preferred salts are chlorides, nitrates, sulfates and acetates.

A preferred group of metal components are those selected from Group VIII of the Periodic Table, such as cobalt, nickel and the platinum series, which are particularly useful in hydrogenation/dehydrogenation and hydrocracking reactions. Salts of these metals are preferably incorporated in molecular sieves having uniform effective pore diameters of 4 to 7 A., an example being the commercially available 5 A. molecular sieves.

The amount of catalytically active metal component encased within the crystalline structure of the aluminosilicate may vary widely and will depend upon the charge stock undergoing conversion as well as on the particular nature of the metal component. Generally, the amount of metal component will be within the range of about 0.01 to 25 percent by weight. When a metal of the platinum series is employed, the amount thereof will generally range from 0.01 to 5 weight percent. With other metal components such as molybdenum, cobalt, tungsten, chromium, iron, vanadium, and nickel, the amounts employed will generally be within the approximate range of 2 to 25 weight percent, it being understood that in any instance, the amount of metal component will be such as to afford selective conversion of the portion of the hydrocarbon charge mixture making contact with the active catalytic surfaces and undergoing conversion.

In corporation of one or more of the above-indicated metals may be achieved in accordance with the method described in copending application Ser. No. 319,639, filed Oct. 29, 1963 now U.S. Patent 3,373,109. In accordance with such method, a solution of a water-soluble metal compound is introduced into the zeolite forming mixture prior to crystallization of the zeolite. The resulting wet metal-containing crystalline zeolite is thereafter treated in accordance with the method of this invention to remove metal components from the surface of the zeolites. Then the catalyst is conventionally dried and subjected to a thermal treatment, preferably by initially heatng in air, and thereafter in hydrogen. The finished catalyst is dry, and contains the metal component distributed in the zeolitic structure in metallic form.

Catalytically active metal components may also be introduced into the crystal aluminosilicate lattice by suitably contacting the zeolitic solids with solutions containing ions of the metal corresponding to the metal cation of the crystalline aluminosilicate undergoing treatment, and ions of the catalytically active metal which it is desired to introduce into the interior of the zeolitic structure, such as cobalt, molybdenum, nickel, iron, etc. Such competing ion technique serves to effectively introduce the active metal component into the interior of the crystalline aluminosilicate zeolite. The ion ratio of catalytically active metal to metal corresponding to the metal cation of the crystalline aluminosilicate being treated is generally in the range of 1:1 to 1:200 and preferably 1:50 to 1:100. Thus, for example, a portion of the sodium or calcium ions normally contained in the molecular sieve structure may be zeolitically replaced with a number of various other ions such as cobalt, nickel, iron, tungsten, vanadium, molybdenum, chromium, etc. Replacement is suitably accomplished by contacting the molecular sieve with a solution containing sodium or calcium ions, and an ionizable compound of the catalytically active metal which is to be zeolitically introduced into the molecular sieve structure for a sufficient time to bring about the extent of desired introduction of the active metal. After such treatment, the molecular sieve is water-washed, exchanged to remove external ions by the method of this invention, and calcined. In some instances, it may be desirable to convert the metal component to the sulfide.

Mere base exchange with a solution of a compound of the catalytically active metal is suitable in this invention, although it may not serve to distribute a major portion of such metal within the interior of the zeolite. Base exchange with such solution must be conducted with a sufficiently large-pore zeolite to place incoming cations within the zeolite, so that subsequent removal of external ions will impart selectivity to the resulting product. It is, however, preferred that the major portion of the active metal-containing surfaces be within the interior of the crystalline aluminosilicate rather than on the exterior surface thereof.

Conventionally prepared crystalline aluminosilicates are characterized by active exterior and interior catalytic surfaces. The exterior catalytically active surfaces arise from the fact that the previous ion exchange with metal cations deposits metal on the exterior surfaces of the zeolite as well as within the interior of the zeolite. It is accordingly necessary to render such exterior surfaces catalytically inactive.

To insure removal of external metal cations in accordance with this invention, the metal-containing zeolite is treated with an ion or ion solution sufficiently large to be incapable of penetrating into the interior of the zeolite, and capable of removing by base exchange any external metal ions.

Tetramethylammonium is an example of an ion sufficiently large to be incapable of penetrating into the interior of a crystalline aluminosilicate having a pore diameter of approximately 6 A. or less. This ion has a diameter of approximately 6.3 A. It may be prepared from a saturated aqueous solution of tetramethylammonium chloride, bromide, acetate or from similar salts. The tetraethylammonium, tetrapropylammonium and tetrabutylammonium ions are also suitable. Other suitable ions may be selected which have an effective diameter larger than the effective pore diameter of the zeolite being treated and where such ion is capable of removing by base exchange catalytically active ions from the surface of the zeolite. Furthermore, such selected ions should be those which do not adversely interfere with the hydrocarbon conversion process in which the zeolite will be used.

Ion solutions which are incapable of penetrating zeolites may be formed from catalytically inactive salts of Group Ia and Group IIa metals such as sodium and calcium, or from ammonium salts, in non-aqueous solutions. The anion of the catalytically inactive salts may be chosen from those given above for the anion of the catalytically active metal salts. Any non-aqueous solution comprising solvent molecules sufficiently large to be incapable of entering the interior of the zeolite and capable of dissolving at least a minor amount of the above-indicated salts may be used. Suitable solvents are: substituted formamides, sulfones and sulfoxides, such as dimethylformamide, dimethylsulfone (molten), dimethylsulfoxide; alcohols, preferably branched chain alcohols having 4 to 12 carbon atoms; ethers, preferably branched, non-primary or cyclic having up to 10 carbon atoms, such as dioxane, tetrahydrofurane, diiospropyl ether; ketones such as 2-butanone; aldehydes such as i-butyraldehyde; organic esters and acids having up to 10 carbon atoms, such as propyl acetate and propionic acid; amines having sufficiently large alkyl- or cycloalkyl groups; amides; nitriles, such as acetonitrile, propionitrile, acrylonitrile; aromatics; substituted aromatics; and heterocyclic compounds such as piperidines and thiophenes. It will be readily appreciated that a wide range of non-aqueous solvents may be chosen according to their molecular size which may be found in standard reference works. The choice of a particular solvent will, of course, depend upon the pore diameter of the zeolite which is to be treated for removal of external metal ions. The solvent is preferably liquid, which includes molten solvents which may be solid at room temperature. A preferred example of a suitable ion solution is calcium chloride dissolved in dimethylformamide.

Thus, a particularly advantageous catalytic composition is one consisting essentially of a metal component dispersed substantially only within the pores of a crystalline zeolite structure characterized by rigid three-dimensional networks and uniform pores, for example, a zeolite having pores approximately 5 Angstroms in diameter. Such composition is catalytically active and also very selective in effecting conversion of hydrocarbon mixtures. Selectivity is, in part, attributable to the uniform pore structure of the composition affording exclusive of branched-chain and other large molecules from the very narrow channels having a pore diameter of about 5 Angstrom units. Thus, the channels in such composition permit adsorption of normal paraffins and olefins having a molecular size smaller than 5 Angstroms while excluding molecules of a size larger than 5 Angstroms such as, for example, iso-paraffins, iso-olefins and cyclic hydrocarbons. The metal component is situated within the crystals of the zeolite, and the crystals of the zeolite admit or reject a reactant molecule depending upon whether or not the diameter of the molecules exceeds the size of the opening in the crystal face. Selectively is improved by removal of active metal catalyst sites from the exterior surface of the zeolite, which is in contact with all components of the hydrocarbon charge. It is accordingly believed that the catalytically active sites are shielded from molecules exceeding a certain critical diameter, permitting the catalytic compositions described herein to exhibit high conversion activity for selected members of a hydrocarbon class. Such selective high activity is accordingly restricted to those molecules which do not exceed a maximum critical diameter corresponding to the particular port size of the crystalline zeolite. Thus, it appears that a molecule which cannot enter the crystal cannot undergo any substantial conversion.

The following examples will serve to illustrate the preparation and use of the catalyst of this invention without limiting the same:

EXAMPLES 1–14

Two grams of 5A aluminosilicate zeolite were contacted for 24 hours with a 100 cc. solution containing 0.6 gram Co++ from $CoCl_2 \cdot 6H_2O$ and 20.4 grams Ca++ from $CaCl_2$, the ratio of Co++ to Ca++ being 1 to 50. The catalyst was filtered and washed with approximately 50 volumes of water to remove unexchanged surface ions, and thereafter treated with several batches of about 5 volumes each of 4 molar tetramethyl ammonium chloride to exchange out external cations. The material was then filtered, washed with about 10 volumes of water and dried in an oven at about 240° F.

A 0.15 gram sample of the above material was introduced as catalyst in a microreactor by sprinkling the same in the form of 600-100 mesh powder on a small piece of glass wool, rolling the latter into a cylinder form and placing in the reactor tube. The catalyst was treated with 60 cc./minute flow of a hydrogen stream for 30 minutes at a temperature of 800° F.

A sample of n-octane was allowed to evaporate into an evacuated vessel until the pressure was 10 millimeters of mercury. The vessel was then filled to atmospheric pressure with hydrogen. A 2 cc. sample of such n-octane charge was introduced into the aforementioned hydrogen stream, passed over the catalyst and into a chromatographic column. The same procedure was repeated with iso-octane.

Hydrocracking of iso and normal octanes at temperatures ranging from 550 to 740° F. were carried out with this catalyst. The results are shown below in Table I.

TABLE I

| Example | Temp., °F. | Charge | Wt. percent cracked |
|---|---|---|---|
| 1 | 550 | $iC_8$ | 0 |
| 2 | 550 | $nC_8$ | 38 |
| 3 | 600 | $iC_8$ | 1.0 |
| 4 | 600 | $nC_8$ | 44 |
| 5 | 630 | $iC_8$ | |
| 6 | 630 | $nC_8$ | |
| 7 | 650 | $iC_8$ | 3 |
| 8 | 650 | $nC_8$ | 63 |
| 9 | 670 | $iC_8$ | |
| 10 | 670 | $nC_8$ | |
| 11 | 700 | $iC_8$ | 12 |
| 12 | 700 | $nC_8$ | 87 |
| 13 | 740 | $iC_8$ | 41 |
| 14 | 740 | $nC_8$ | 90 |

As will be evident from the foregoing data, the catalyst employed in every instance exhibited hydrocracking selectivity for the normal octanes as compared with the iso-octanes. Within the temperature range employed, selectivity was greater at the lower temperatures, with optimum temperatures being below about 700° F.

EXAMPLES 15–26

Two grams of 5A aluminosilicat zeolite were contacted for 24 hours with a 100 cc. solution containing 0.6 gram Ni++ from $NiCl_2 \cdot 6H_2O$ and 20.4 grams Ca++ from $CaCl_2$, the ratio of Ni++ to Ca++ being 1 to 50. The catalyst was filtered and washed with approximately 50 volumes of water to remove unexchanged surface ions, and thereafter treated with several batches of about 5 volumes each of 4 molar tetramethyl ammonium chloride to exchange out external cations. The material was then filtered, washed with about 10 volumes of water and dried in an oven at about 240° F.

A 0.15 gram sample of the above catalyst was introduced into a microreactor in the manner described in Example 1. Hydrocracking of iso and normal octanes at temperatures ranging from 550 to 700° F. were carried out with this catalyst. The results are shown in Table II.

TABLE II

| Example | Temp., °F. | Charge | Wt. percent cracked |
|---|---|---|---|
| 15 | 550 | $iC_8$ | 0 |
| 16 | 550 | $nC_8$ | 32 |
| 17 | 600 | $iC_8$ | 1.2 |
| 18 | 600 | $nC_8$ | 82 |
| 19 | 630 | $iC_8$ | 23 |
| 20 | 630 | $nC_8$ | 83 |
| 21 | 650 | $iC_8$ | |
| 22 | 650 | $nC_8$ | |
| 23 | 670 | $iC_8$ | 27.5 |
| 24 | 670 | $nC_8$ | 83 |
| 25 | 700 | $iC_8$ | 38 |
| 26 | 700 | $nC_8$ | 87 |

The catalyst employed in every case again exhibited hydrocracking selectivity for the normal octanes as compared with the iso-octanes. Within the temperature range employed, selectivity was greater at the lower temperatures, with optimum temperatures being below about 670° F.

EXAMPLES 27–28

For Example 27 a batch of 5A crystalline aluminosilicate was base exchange using a solution containing cobaltous chloride and calcium chloride, the ratio of Co++ to Ca++ being 1 to 50. The mixture was rolled for 4 hours, vacuum filtered, water-washed to remove unexchanged surface ions, and thereafter treated several times with a solution of calcium chloride in dimethylformamide. The last step served to remove the cobalt cations from the exterior catalyst surface.

For Example 28 a batch of 5A crystalline aluminosilicate was treated in a manner identical with that of Example 27, except that nickelous chloride was employed in place of cobaltous chloride.

After being calcined at 900° F., the catalysts of Examples 27–28 were tested for ability to hydrocrack iso and normal octanes at atmospheric pressure and 0.15 second contact time utilizing the technique described in Example 1. The results are set forth below in Table III.

TABLE III

| Catalyst Example | Temperature | Cracked products, iso-octane | Wt. percent from n-octane | Ratio nC$_8$ Conv./iC$_8$ Conv. |
|---|---|---|---|---|
| 27 | 790 | 34.1 | 71.0 | 2.08 |
|  | 850 | 57.2 | 82.5 | 1.44 |
| 28 | 790 | 13 | 65.2 | 5.02 |
|  | 850 | 21.7 | 69.9 | 3.22 |

It will be seen from the above tabulated data that the catalysts of Examples 27 and 28, wherein the active hydrogenation metal-containing surfaces were within the interior of the crystalline aluminosilicate, possessed selectivity for cracking normal octane.

EXAMPLE 29–30

Example 29.—A 10 ml. sample of 12–25 mesh 5A aluminosilicate was treated with 25 ml. of solution containing 50:1 Ca++ to Co++ (56.5 g. CaCl$_2$+2.42 g. CoCl$_2$·6H$_2$O per 100 ml. aqueous solution). After rolling for 25 minutes, the zeolite was filtered, washed with 150 ml. water and dried overnight at 110° C. This relatively short time period for exchange does not permit equilibrium to be established and will provide a catalyst with a greater amount of metal component on the surface, in order to illustrate the effect of surface removal of metal ions.

Example 30.—A 3 ml. aliquot of the catalyst of Example 29 was given three 2-hour treatments with a saturated aqueous solution of tetramethylammonium bromide, washed with water, and dried at 105° C. for one hour.

Example 31.—A second 3 ml. aliquot of the catalyst of Example 29 was given three 2-hour treatments with a saturated calcium chloride/dimethyl formamide solution, washed with 100 ml. of dry dimethyl formamide, and dried at 105° C. for one hour.

Each catalyst was tested for hydrogenation activity as follows. A 0.15 g. sample was treated for one hour at 700° F. with hydrogen flowing through a pulse type microcatalytic reactor at 60 ml./minute. Pulses of isobutene and 1-butene were injected into the hydrogen stream and over the reactor at 300° F. Products from these reactions were analyzed by gas chromatography. The results are given in Table IV.

TABLE IV

| Catalyst Example | Charge | Products Wt. percent isobutane | Wt. percent n-butane | Product selectivity n-butane isobutane |
|---|---|---|---|---|
| 29 | Isobutene | 35.5 |  |  |
|  | 1-butene |  | 11.7 | 0.33 |
| 30 | Isobutene | 0.7 |  |  |
|  | 1-butene |  | 6.1 | 8.7 |
| 31 | Isobutene | 5.2 |  |  |
|  | 1-butene |  | 27.0 | 5.2 |

The above-tabulated data indicate the advantages of the present invention. The catalysts which were treated to remove surface metal ions (Examples 30–31) showed superior selectivity for the hydrogenation of the normal butene over the isobutene.

It will accordingly be understood that the above description is merely illustrative of preferred embodiments of the invention of which many variations may be made within the scope of the following claims by those skilled in the art without departing from the spirit thereof.

What is claimed is:

1. A crystalline aluminosilicate zeolite having rigid three dimensional networks within the interior of which is distributed a hydrogenation component comprising a metal or compound thereof, said zeolite having been treated, subsequent to distribution, by base exchange of the metal of the hydrogenation component, with an ion solution, the solvent of which is substantially incapable of penetrating into the interior of said zeolite, which solution is capable of removing, by base exchange, ions of the metal of the hydrogenation component from the exterior surface of the zeolite.

2. The composition of claim 1 wherein the metal of said hydrogenation comprises cobalt.

3. The composition of claim 1 wherein the metal of said hydrogenation component comprises nickel.

4. The composition of claim 1 wherein the metal of said hydrogenation component is shown from Group VIII of the Periodic Table.

5. The composition of claim 1 wherein said zeolite has a uniform effective pore diameter of about 4 to 7 angstrom units.

6. A hydrocarbon conversion process which comprises passing a hydrocarbon charge stock under conversion conditions over the catalyst composition of claim 1.

7. A process for making a crystalline aluminosilicate zeolite catalyst which comprises distributing, by base exchange within the interior of said zeolite, a hydrogenation component comprising a metal or compound thereof, and subsequently treating said zeolite with an ion solution the solvent of which is substantially incapable of penetrating into the interior of said zeolite, which solution is capable of removing, by base exchange, ions of the metal of said hydrogenation component from the exterior of said zeolite.

8. The process of claim 7 wherein said ion solution comprises a calcium ion dissolved in dimethylformamide and said zeolite has a pore size sufficiently small to exclude dimethylformamide.

9. The process of claim 7 wherein said ion solution comprises a metal cation selected from Groups I$a$ and II$a$ of the Periodic Table in a non-aqueous solution.

10. The process of claim 9 wherein said ion solution comprises a metal salt in an organic solvent, said solvent consisting essentially of molecules having an effective diameter greater than the effective pore diameter of said zeolite.

References Cited

UNITED STATES PATENTS 3,264,208    8/1966    Plank et al. _____ 252—455 X
3,314,895    4/1967    Munns _____ 252—455

DANIEL E. WYMAN, Primary Examiner

C. F. DEES, Assistant Examiner

U.S. Cl. X.R.

252—455

PO-1050
(5/69)

UNITED STATES PATENT OFFICE
CERTIFICATE OF CORRECTION

Patent No. 3,509,042  Dated April 28, 1970

Inventor(s) Joseph N. Miale

It is certified that error appears in the above-identified patent and that said Letters Patent are hereby corrected as shown below:

Column 2, line 23, "and 15 Angstrom" should be --and about 15 Angstrom--.
Column 3, line 33, "component will" should be --component present will--.
Column 3, line 48, "heatng" should be --heating--.
Column 8, line 22, "component is shown" should be --component is chosen--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents